(12) United States Patent
Iwasaki et al.

(10) Patent No.: US 8,471,957 B2
(45) Date of Patent: Jun. 25, 2013

(54) LENS BARREL WITH SUPPORTING FLAMES AND IMAGING DEVICE

(75) Inventors: Shinichi Iwasaki, Osaka (JP); Tetsuya Uno, Osaka (JP); Kazuharu Matsumoto, Yamagata (JP)

(73) Assignee: Panasonic Corporation, Osaka (JP)

( * ) Notice: Subject to any disclaimer, the term of this patent is extended or adjusted under 35 U.S.C. 154(b) by 253 days.

(21) Appl. No.: 12/836,589

(22) Filed: Jul. 15, 2010

(65) Prior Publication Data

US 2011/0019078 A1 Jan. 27, 2011

(30) Foreign Application Priority Data

Jul. 24, 2009 (JP) ................................. 2009-172704

(51) Int. Cl.
*H04N 5/225* (2006.01)

(52) U.S. Cl.
USPC .......................................... 348/374; 348/335

(58) Field of Classification Search
USPC ............................ 348/335, 373–375; 396/542
See application file for complete search history.

(56) References Cited

U.S. PATENT DOCUMENTS

| 4,596,454 A | 6/1986 | Kawai et al. |
| 4,951,083 A | 8/1990 | Okura et al. |
| 5,371,569 A | 12/1994 | Tanaka |
| 5,655,171 A | 8/1997 | Machida et al. |
| 5,717,969 A | 2/1998 | Miyamoto et al. |
| 5,826,126 A | 10/1998 | Nomura et al. |
| 6,052,535 A | 4/2000 | Uno |
| 6,493,511 B2 | 12/2002 | Sato |
| 6,714,360 B2 * | 3/2004 | Kawanabe ..................... 359/704 |
| 7,131,773 B2 | 11/2006 | Sakamoto |
| 7,623,782 B2 | 11/2009 | Yu |
| 2002/0025148 A1 * | 2/2002 | Sato ............................. 396/542 |
| 2005/0254815 A1 * | 11/2005 | Sakamoto ..................... 396/462 |
| 2007/0189766 A1 * | 8/2007 | Kuwahara et al. ............ 396/542 |
| 2008/0180812 A1 | 7/2008 | Honsho et al. |

FOREIGN PATENT DOCUMENTS

| JP | H05-134159 A | 5/1993 |
| JP | H07-063969 A | 3/1995 |
| JP | H07-218799 | 8/1995 |
| JP | H07-049471 Y2 | 11/1995 |
| JP | H08-254646 A | 10/1996 |
| JP | H11-133288 A | 5/1999 |

(Continued)

OTHER PUBLICATIONS

Iwasaki, et al., "Lens Barrel and Imaging Device," filed Jul. 16, 2010, U.S. Appl. No. 12/837,512.

(Continued)

*Primary Examiner* — Gevell Selby
(74) *Attorney, Agent, or Firm* — Shinjyu Global IP

(57) ABSTRACT

The lens barrel includes a flexible wire, a first supporting frame, and a second supporting frame. The flexible wire has a first end, a second end, and a flexible mounting portion. The first end includes at least one terminal. The second end includes at least one terminal. The mounting portion is disposed between the first end and the second end. The first supporting frame is configured to support the first end. The second supporting frame includes a storage component configured to support the mounting portion and is movably disposed in a first direction.

24 Claims, 15 Drawing Sheets

FOREIGN PATENT DOCUMENTS

| | | |
|---|---|---|
| JP | 2001-021789 A | 1/2001 |
| JP | 2002-072040 A | 3/2002 |
| JP | 2002-357757 A | 12/2002 |
| JP | 2003-075708 A | 3/2003 |
| JP | 2005-055664 A | 3/2005 |
| JP | 2007-165412 A | 6/2007 |
| JP | 2008-185786 A | 8/2008 |

OTHER PUBLICATIONS

Office Action (mailed Dec. 23, 2011) issued in co-pending U.S. Appl. No. 12/837,512.

Notice of Allowance (mailed May 24, 2012) issued in co-pending U.S. Appl. No. 12/837,512.

* cited by examiner

US 8,471,957 B2

LENS BARREL WITH SUPPORTING FLAMES AND IMAGING DEVICE

CROSS-REFERENCE TO RELATED APPLICATIONS

This application claims priority under 35 U.S.C. §119 to Japanese Patent Application No. 2009-172704 filed on Jul. 24, 2009. The entire disclosure of Japanese Patent Application No. 2009-172704 is hereby incorporated herein by reference.

BACKGROUND

1. Technical Field

The technology disclosed herein relates to an imaging device and a lens barrel used with the imaging device.

2. Background Information

Imaging devices that make use of a CCD (charge coupled device) sensor, a CMOS (complementary metal-oxide semiconductor) sensor, or another such imaging sensor have become extremely popular in recent years. Examples of such imaging devices include digital still cameras and digital video cameras. These imaging devices are generally equipped with a lens barrel for forming an optical image of a subject on an imaging element. The type of lens barrel generally used is a telescoping lens barrel, which is usually stored inside the camera body when not being used to form an optical image of the subject.

SUMMARY

One aspect of the technology disclosed herein is a lens barrel that comprises a flexible wire, a first supporting fame, and a second supporting frame. The flexible wire includes a first end with at least one terminal, a second end with at least one terminal, and a mounting portion disposed between the first end and the second end. The first supporting frame is configured to support the first end. The second supporting frame includes a storage component configured to support the mounting portion and is movably disposed in a first direction.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Digital Camera

Figure 1:
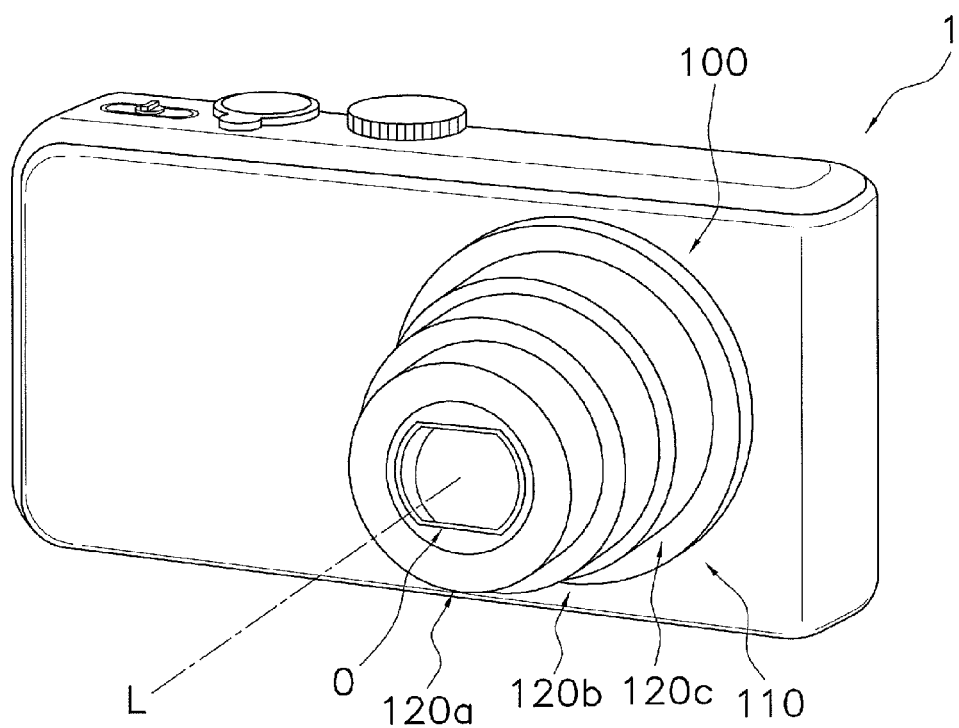
FIG. 1 is an oblique view of a digital camera.

Referring initially to FIG. 1, a lens barrel 100 mounted on a digital camera 1 (an example of an imaging device) is illustrated in accordance with a first embodiment. Examples of imaging devices include digital still camera and digital video cameras that make use of an imaging element. Examples of imaging elements include CCD image sensors and CMOS image sensors.

Overall Configuration of Lens Barrel

Figure 2:
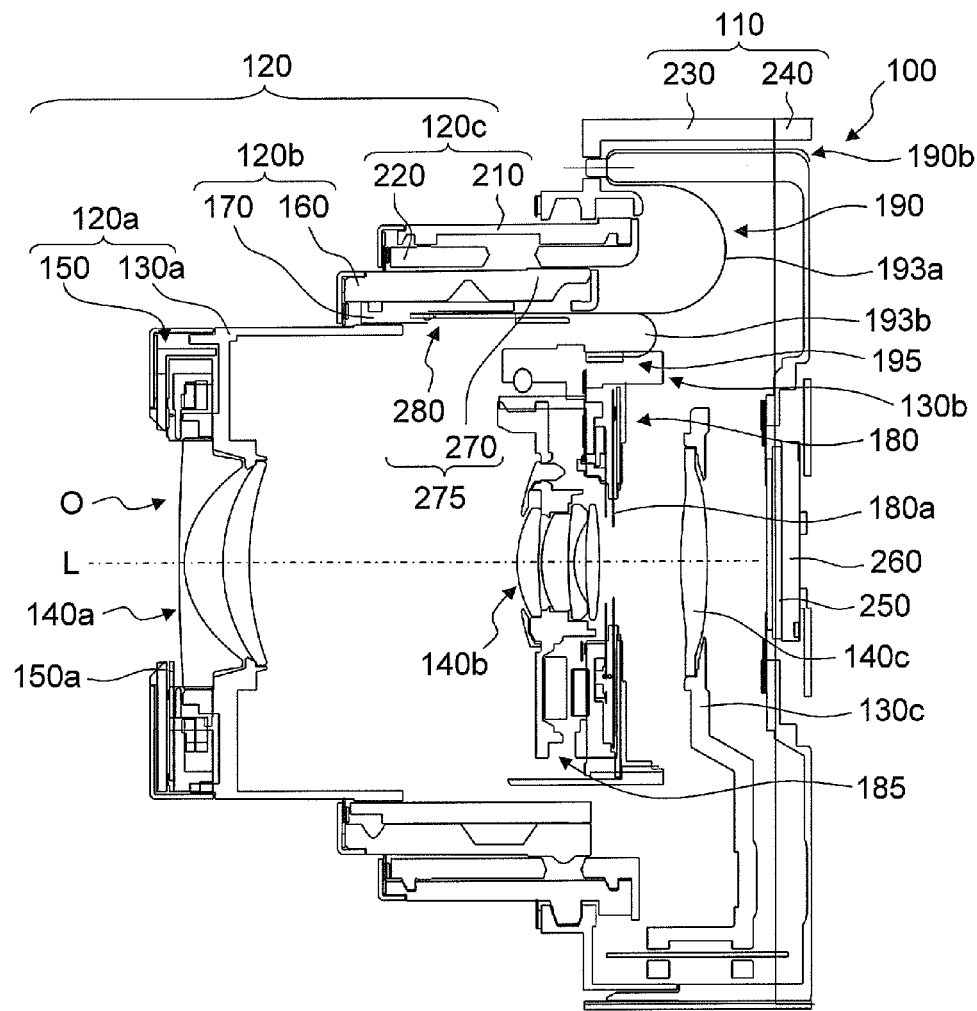
FIG. 2 is a cross section of a lens barrel (wide angle end)
Figure 3:
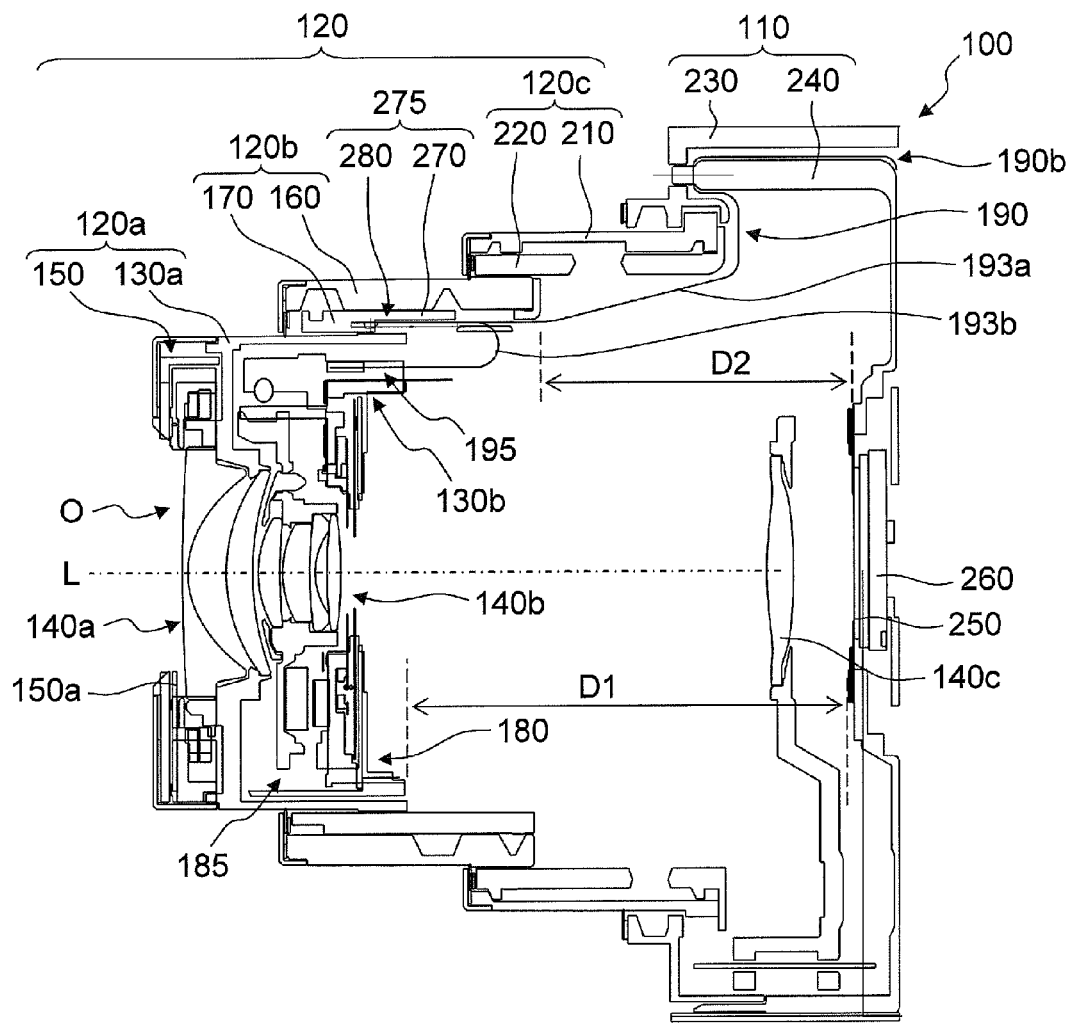
FIG. 3 is a cross section of a lens barrel (telephoto end)
Figure 4:
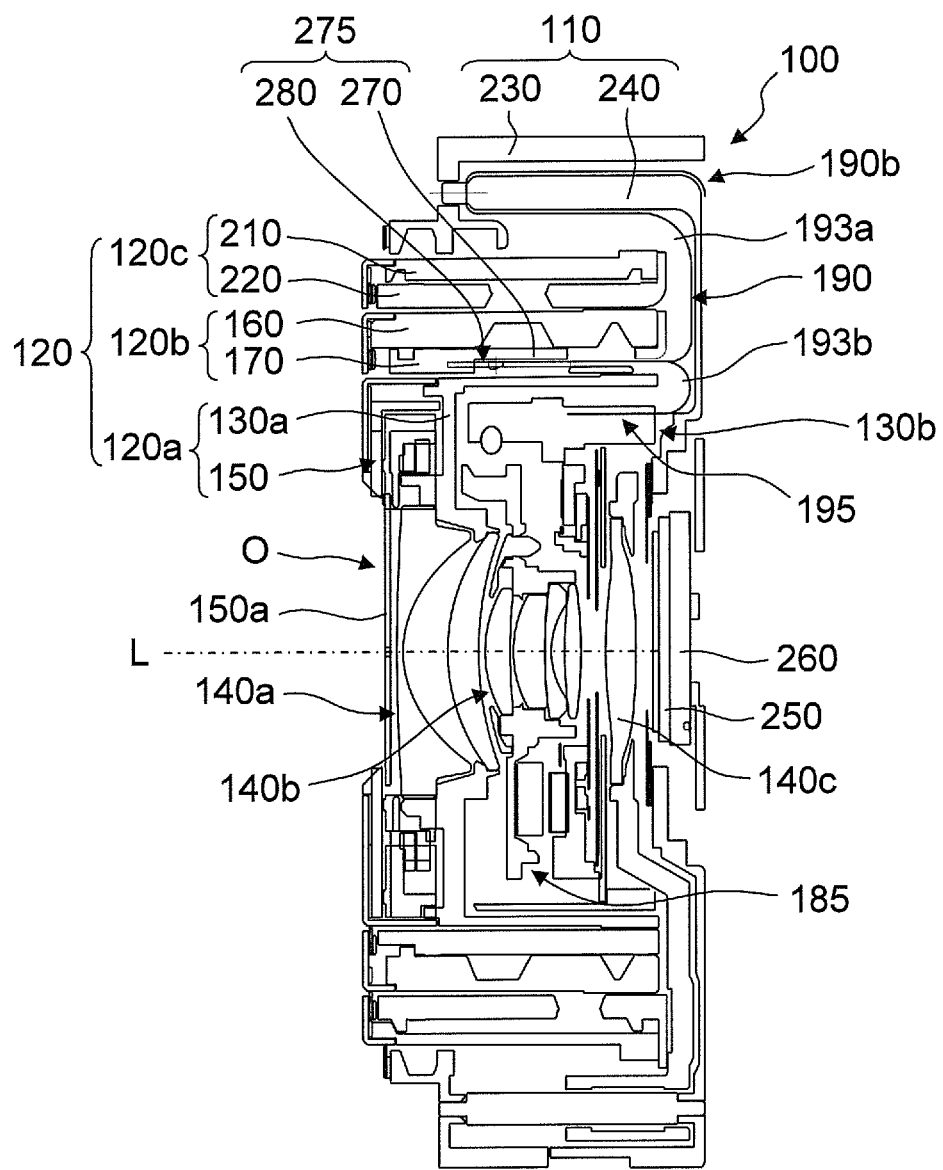
FIG. 4 is a cross section of a lens barrel (when retracted)
Figure 5:
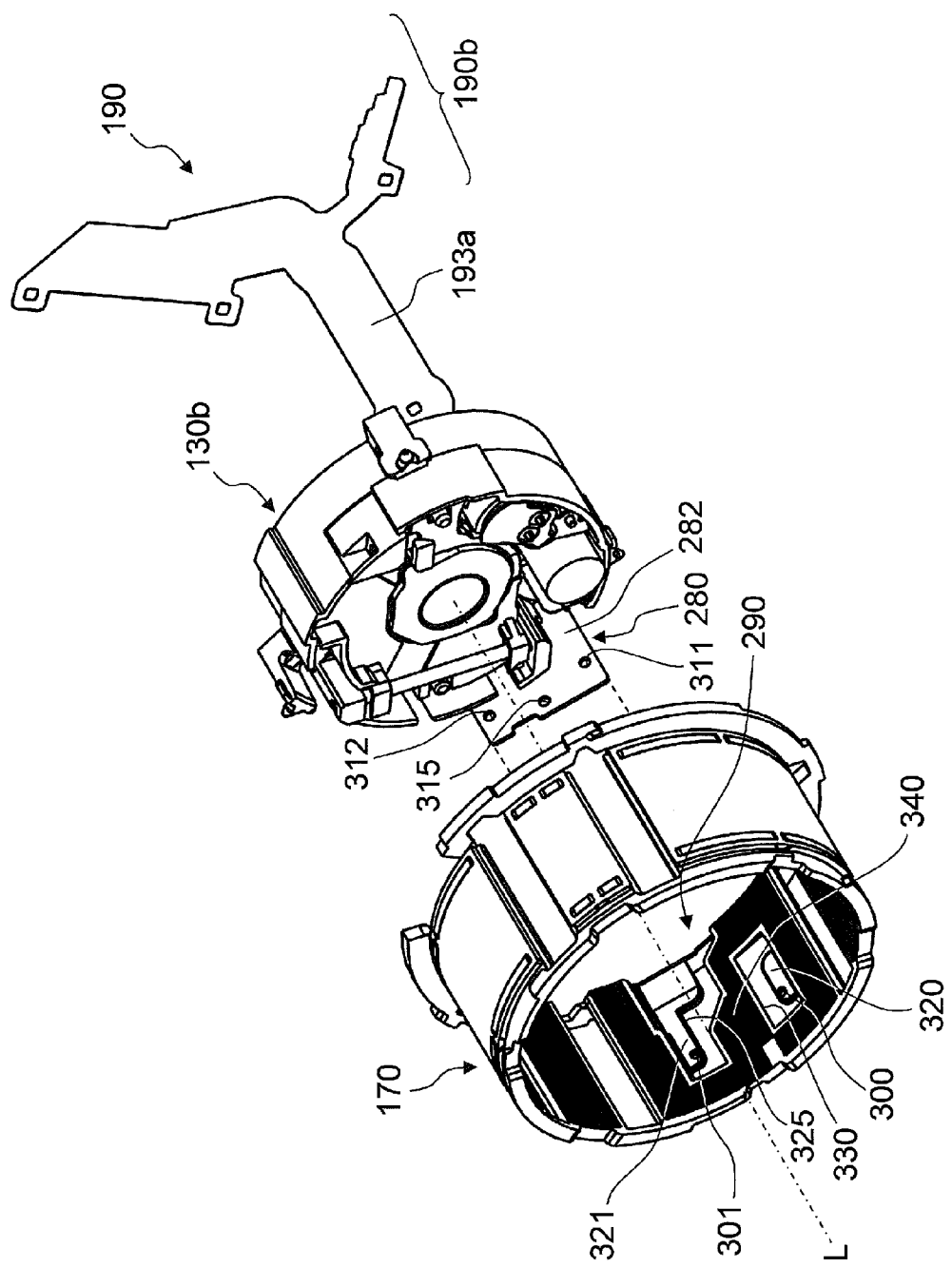
FIG. 5 is an exploded oblique view of a rectilinear frame and a second lens frame.
Figure 6:
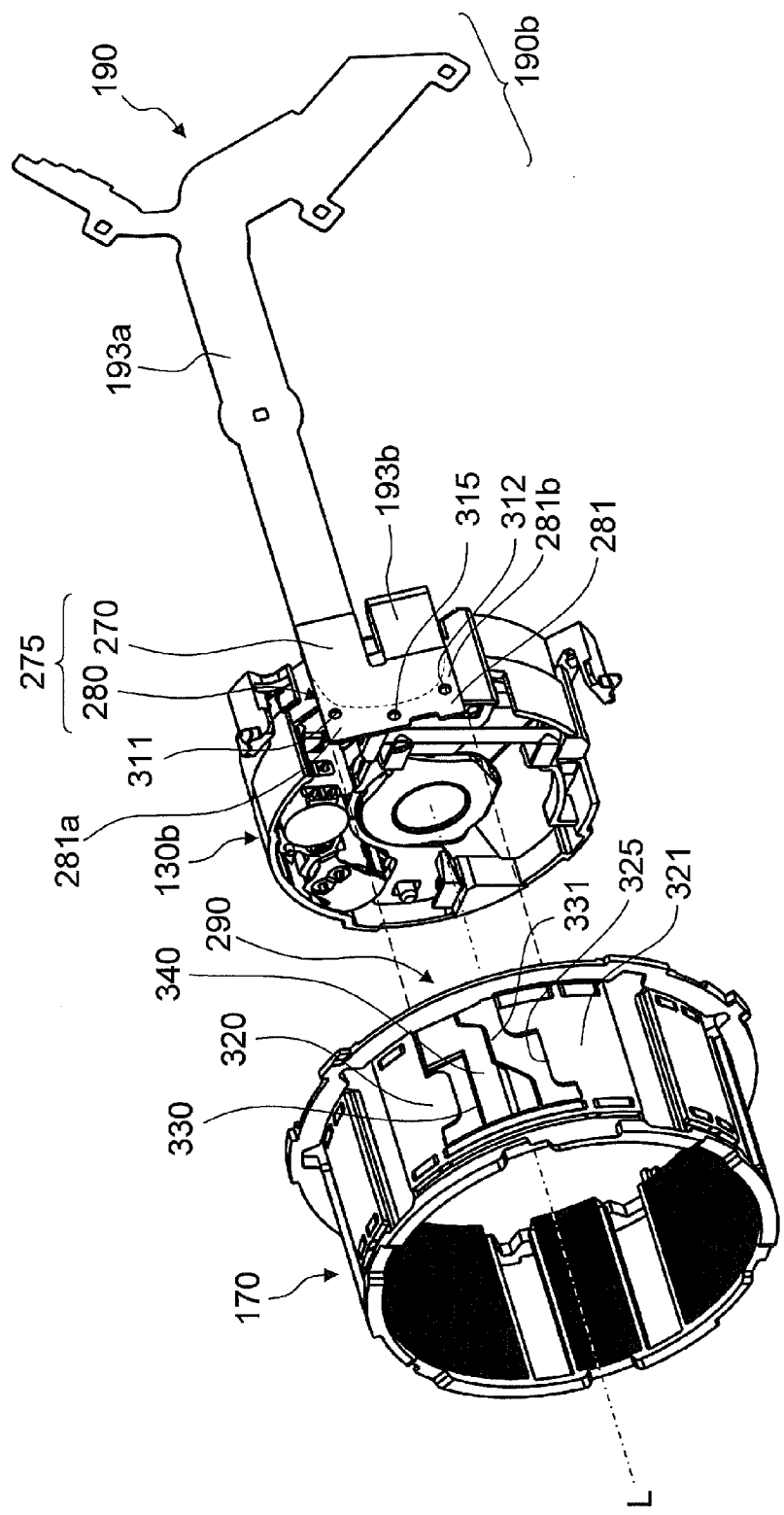
FIG. 6 is an exploded oblique view of a rectilinear frame and a second lens frame.
Figure 7:
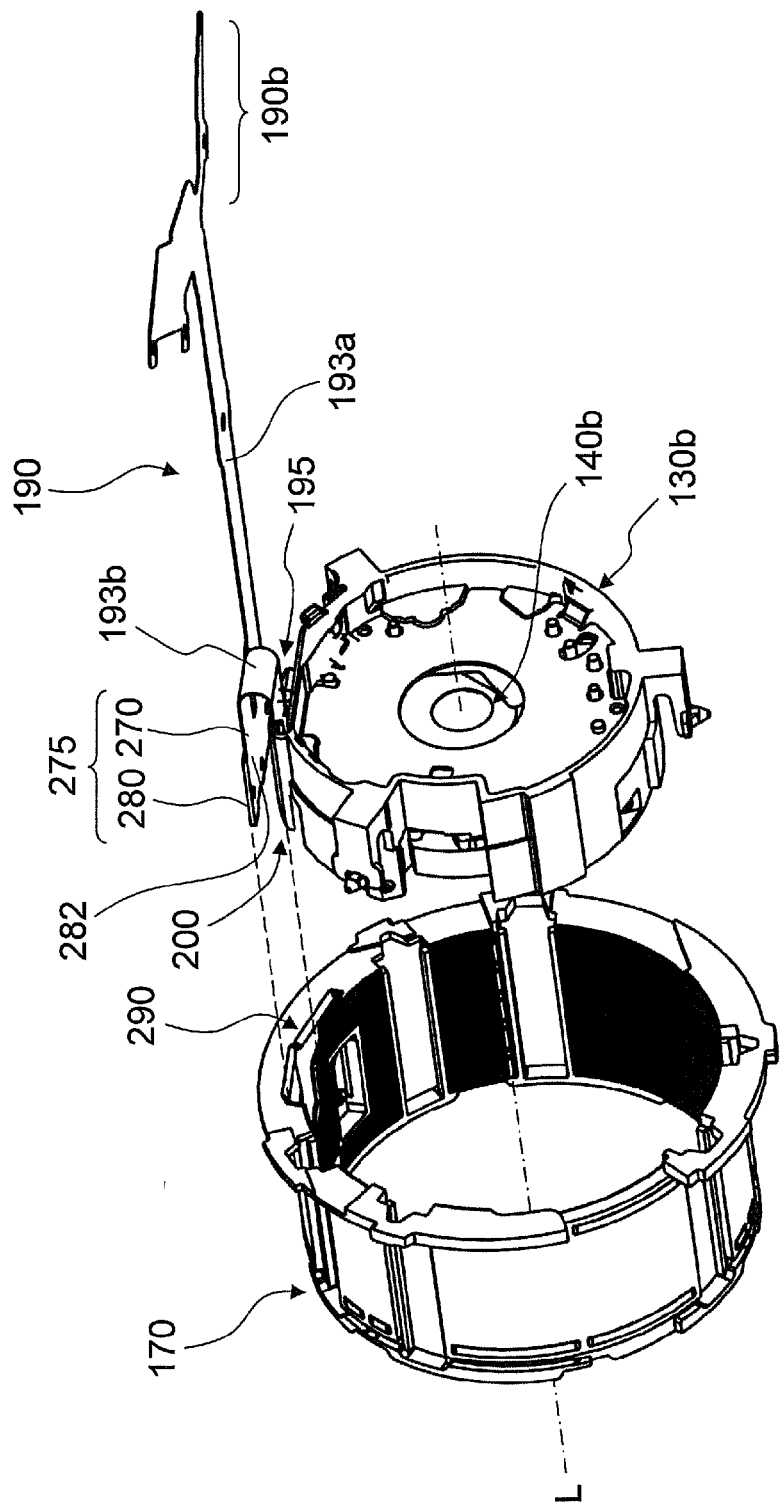
FIG. 7 is an exploded oblique view of a rectilinear frame and a second lens frame.

The overall configuration of the lens barrel 100 will be described. As shown in FIGS. 2 to 4, the lens barrel 100 comprises an optical system O, a fixed lens barrel 110 (an example of a first supporting frame), a moving lens barrel 120 disposed inside the fixed lens barrel 110, and a CCD unit 260 (an example of an imaging element).

The optical system O has a first lens group 140a, a second lens group 140b, and a third lens group 140c. The optical system O also an optical axis L defined by these lens groups. A direction parallel to the optical axis L will hereinafter also be called the optical axis direction. The optical axis direction is an example of a first direction in which the second supporting frame moves with respect to the first supporting frame.

The first to third lens groups 140a to 140c each is made up of a plurality of lenses. However, the first to third lens groups 140a to 140c can instead each is made up of a single lens. The first lens group 140a is a lens group for taking in an optical image of a subject. The second lens group 140b is used for zoom adjustment. The third lens group 140c is used for focus adjustment. The zoom and focus are adjusted by changing the spacing between the first to third lens groups 140a to 140c.

The moving lens barrel 120 is deployed forward (toward the subject) with respect to the fixed lens barrel 110, and stowed inside the fixed lens barrel 110. More specifically, the moving lens barrel 120 has a first moving lens barrel 120a, a second moving lens barrel 120b (an example of the second supporting frame), a third moving lens barrel 120c, and a second lens frame 130b (an example of a third supporting frame).

The second moving lens barrel 120b is disposed inside the third moving lens barrel 120c, and the first moving lens barrel 120a is disposed inside the second moving lens barrel 120b. During imaging, the second moving lens barrel 120b is deployed with respect to the third moving lens barrel 120c, and the first moving lens barrel 120a is deployed with respect to the second moving lens barrel 120b. During retraction, the second moving lens barrel 120b is stowed in the third moving lens barrel 120c, and the first moving lens barrel 120a is stowed in the second moving lens barrel 120b. Thus, the first to third moving lens barrels 120a to 120c are deployed forward with respect to the fixed lens barrel 110, or are stowed in the fixed lens barrel 110. When the first to third moving lens barrels 120*a* to 120*c* have been deployed forward, the first moving lens barrel 120*a* is deployed at the very front.

Detailed Configuration of Lens Barrel

The lens barrel 100 will now be described in detail.

As shown in FIGS. 2 to 4, the fixed lens barrel 110 has a cylindrical fixing frame 230 and a master flange 240 that is fixed to this fixing frame 230. The third moving lens barrel 120*c* is disposed inside the fixing frame 230 to be movable in the optical axis direction. A third lens frame 130*c* is supported by the fixing frame 230 to be movable in the optical axis direction. The CCD unit 260 (an example of an imaging element) and an IR-filtering glass 250 for blocking out infrared rays are disposed at a central part of the master flange 240.

As shown in FIGS. 2 to 4, the first moving lens barrel 120*a* has a first lens frame 130*a* and a barrier unit 150 for protecting the first lens group 140*a*. The first lens group 140*a* is fixed to the first lens frame 130*a*. The barrier unit 150 is disposed on the front (on the subject side) of the first lens frame 130*a*. The barrier unit 150 has a plurality of barrier blades 150*a*. During imaging, the barrier blades 150*a* open and allow light to be incident on the first lens group 140*a* (see FIGS. 2 and 3, for example). At other times (that is, when the lens barrel is retracted), the barrier blades 150*a* close, and the first lens group 140*a* is protected by the barrier blades 150*a* (see FIG. 4, for example).

As shown in FIGS. 2 to 4, the second moving lens barrel 120*b* has a cylindrical camera cam frame 160 and a cylindrical rectilinear frame 170 disposed inside the camera cam frame 160. The first moving lens barrel 120*a* is disposed inside the rectilinear frame 170 movably in the optical axis direction. The first moving lens barrel 120*a* and the second lens frame 130*b* are supported by the second moving lens barrel 120*b* movably in the optical axis direction. More specifically, a cam groove is formed in the inner peripheral face of the camera cam frame 160. This cam groove guides the first lens frame 130*a* and the second lens frame 130*b* in the optical axis direction. As a result, the first lens group 140*a* and the second lens group 140*b* move in the optical axis direction according to the shape of the cam groove. A rectilinear groove is formed in the rectilinear frame 170. This rectilinear frame 170 causes the first lens group 140*a* and the second lens group 140*b* to move in the optical axis direction without rotating with respect to the fixed lens barrel 110.

As shown in FIGS. 2 to 4, the third moving lens barrel 120*c* has a cylindrical drive frame 210 and a cam through-frame 220 disposed inside the drive frame 210. The second moving lens barrel 120*b* is disposed inside the cam through-frame 220 movably in the optical axis direction.

As shown in FIGS. 2 to 4, a shutter unit 180, a shake correcting mechanism 185, and a stop mechanism (not shown) are attached, for example, to the second lens frame 130*b*. The shutter unit 180 has a shutter 180*a* disposed to the rear of the second lens group 140*b*. The shake correcting mechanism 185 supports the second lens group 140*b* movably within a plane perpendicular to the optical axis L. It could also be said that the second lens group 140*b* is supported by the second lens frame 130*b*. The stop mechanism adjusts the aperture of the optical system O. Control signals from a controller (not shown) are transmitted via flexible wire 190 to the shutter unit 180, the shake correcting mechanism 185, and the stop mechanism.

Detailed Configuration of Flexible Wiring

Figure 8:
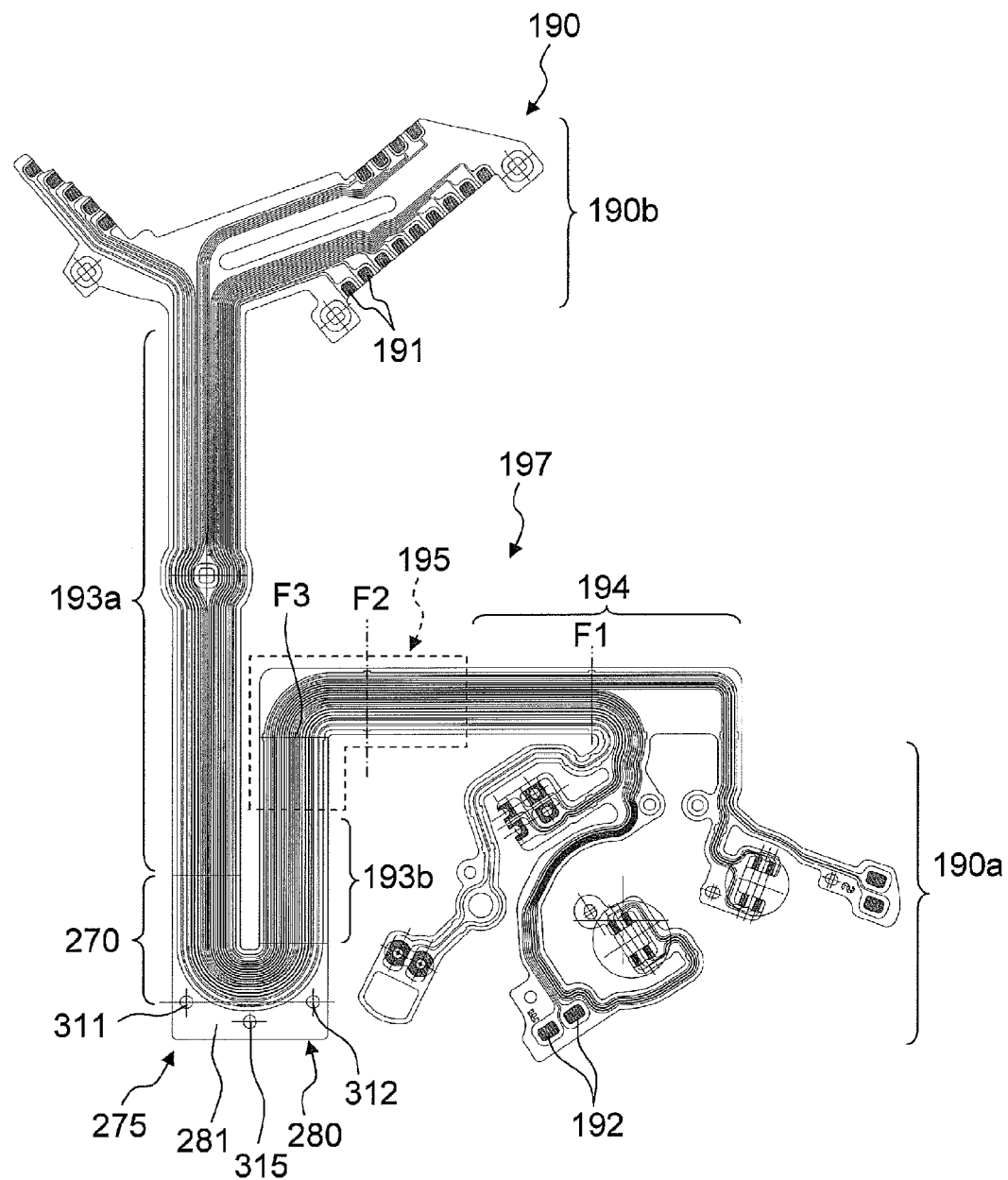
FIG. 8 is a developed view of a flexible wire.

The flexible wire 190 will now be described in detail. As shown in FIGS. 2 to 4, the flexible wire 190 is a film-like member on which wiring is printed, and is disposed to the inside of a moving lens barrel 120 and a fixed lens barrel 110. As shown in FIG. 8, the flexible wire 190 has a first end 190*b* (an example of a first end), a second end 190*a* (an example of a second end), a first linking portion 193*a* (an example of a first linking portion), a second linking portion 197 (an example of a second linking portion), and a flexible mounting portion 275 (an example of a flexible mounting portion).

The first end 190*b* includes a plurality of terminals 191. The terminals 191 of the first end 190*b* are connected to a plurality of terminals (not shown) disposed at the fixed lens barrel 110. It could also be said that the first end 190*b* is supported by the fixed lens barrel 110.

The second end 190*a* includes a plurality of terminals 192. The terminals 192 of the second end 190*a* are connected to a plurality of terminals (not shown) disposed at the second lens frame 130*b*. That is, it could also be said that the second end 190*a* is supported by the second lens frame 130*b*.

The first linking portion 193*a* is a band-shaped portion disposed between the first end 190*b* and the mounting portion 275, and links the first end 190*b* and the mounting portion 275. The first linking portion 193*a* is a film-like member on which wiring is printed, and extends from the fixed lens barrel 110 to the rectilinear frame 170.

The second linking portion 197 is disposed between the second end 190*a* and the mounting portion 275, and links the second end 190*a* and the mounting portion 275. More specifically, the second linking portion 197 has a first intermediate portion 193*b*, a folded portion 195, and a second intermediate portion 194. The folded portion 195 comprises a band-shaped portion that is folded over itself. More specifically, the flexible wire 190 is bent at a first bending line F1, a second bending line F2, and a third bending line F3. The folded portion 195 is supported by the second lens frame 130*b*. The first intermediate portion 193*b* links the mounting portion 275 and the folded portion 195, and extends from the rectilinear frame 170 to the second lens frame 130*b*. The second intermediate portion 194 links the folded portion 195 and the second end 190*a*.

The length from the first end 190*b* to the second end 190*a* (more precisely, the length of the first linking portion 193*a* and the first intermediate portion 193*b*) is set to be long enough not to affect the movement of the second lens frame 130*b* and the rectilinear frame 170. As shown in FIG. 3, when the second lens frame 130*b* is the farthest away from the fixed lens barrel 110, the flexible wire 190 is lightly taut. As shown in FIG. 4, when the second lens frame 130*b* has moved closer to the fixed lens barrel 110, the flexible wire 190 is slack. In the retracted state shown in FIG. 4, the first linking portion 193*a* goes back and forth between the second moving lens barrel 120*b* and the master flange 240, and between the third moving lens barrel 120*c* and the master flange 240. Further, the first intermediate portion 193*b* goes back and forth between the first lens frame 130*a* and the master flange 240.

The mounting portion 275 functions as a relay end disposed between the first end 190*b* and the second end 190*a*, and is supported by the rectilinear frame 170. The mounting portion 275 has a curved part 270 (an example of a wiring part) and a flat reinforcing member 280. The curved part 270 is film-like portion on which plurality of wires have been printed. The curved part 270 has a U-shape from the first linking portion 193*a* to the second linking portion 197. The first linking portion 193*a* and the first intermediate portion 193*b* are pulled out from the mounting portion 275 so that the wiring sides are mutually reversed. The reinforcing member 280 is a member for reinforcing the curved part 270 and is fixed to the curved part 270. The stiffness of the reinforcing member 280 is greater than the stiffness of the curved part 270, the first linking portion 193*a* and the second linking portion 197. Therefore, the stiffness of the mounting portion 275 is greater than the stiffness of the first linking portion 193a and the second linking portion 197.

The reinforcing member 280 has a first support hole 311 (an example of a first support hole, and an example of a hole), a second support hole 312 (an example of a second support hole, and an example of a hole), and a auxiliary hole 315. A first protrusion 300 (discussed below) is inserted into the second support hole 312. A second protrusion 301 (discussed below) is inserted into the second support hole 312. The auxiliary hole 315 is used to insert pliers or another such tool during assembly. As will be described below, the mounting portion 275 is removably mounted to the rectilinear frame 170.

Detailed Configuration of Rectilinear Frame

Figure 11:
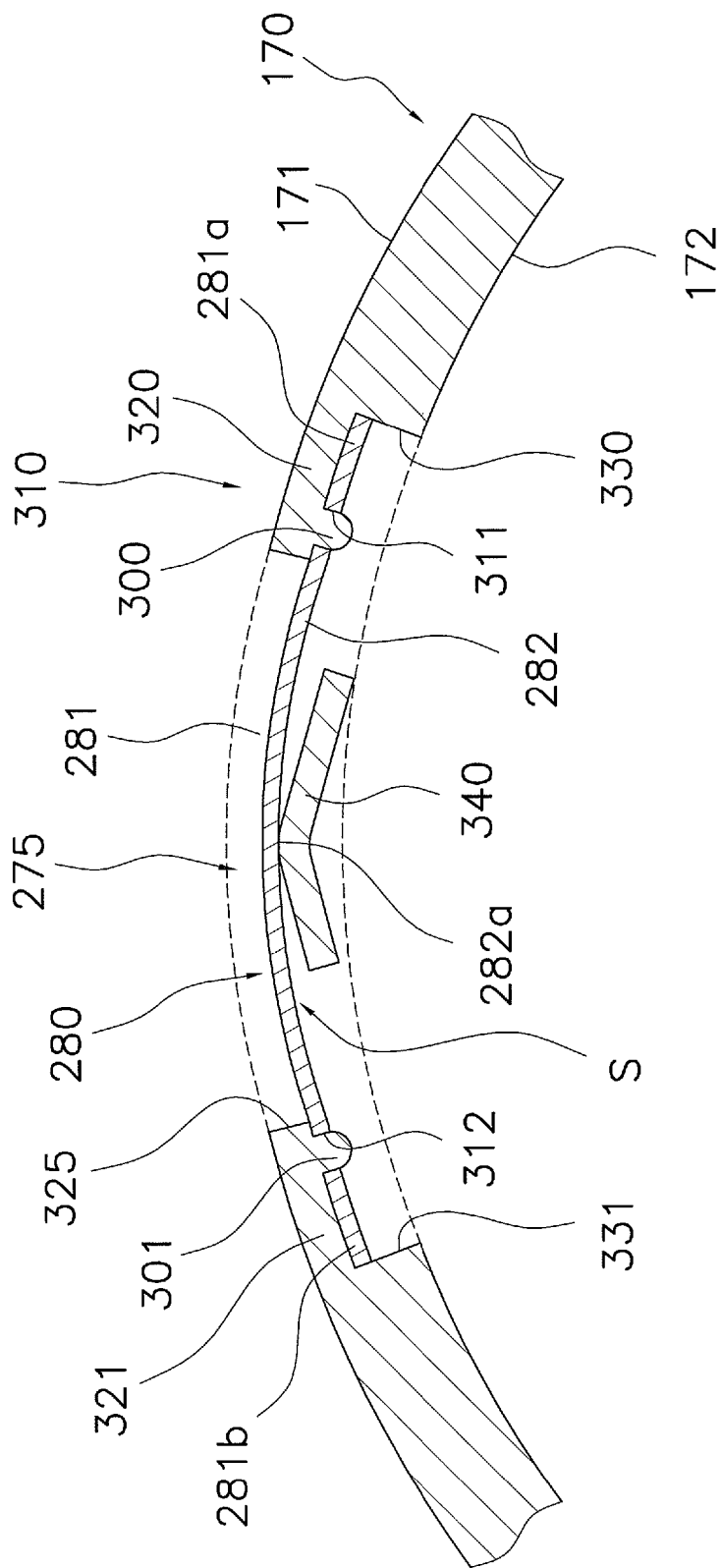
FIG. 11 is a cross section of a storage component and the flexible wire.

The rectilinear frame 170 has a storage component 290 that supports the mounting portion 275. The storage component 290 removably supports the mounting portion 275 by way of the elastic force of the mounting portion 275. More specifically, as shown in FIG. 11, the mounting portion 275 is inserted in a bent state into the storage component 290 in the optical axis direction. The mounting portion 275 bends in the shape of an arc whose center is a reference line parallel to the optical axis direction. In this embodiment, this reference line substantially coincides with the optical axis L. Also, the mounting portion 275 is inserted into the storage component 290 from the rear of the storage component 290 (the side on which a CCD unit 260 is disposed) and is disposed between the outer peripheral face 171 and the inner peripheral face 172 of the rectilinear frame 170.

Figure 9:
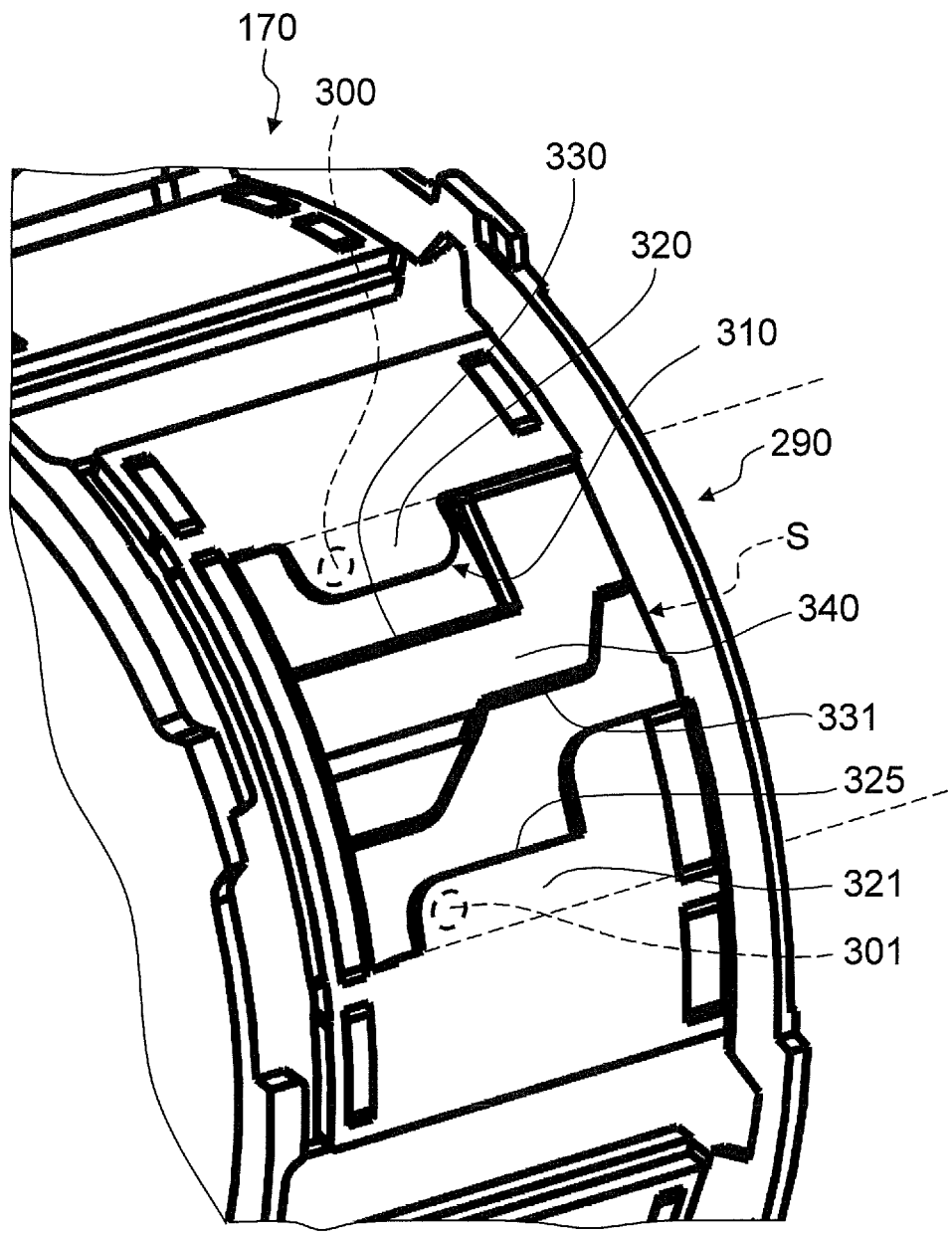
FIG. 9 is an enlarged oblique view of a storage component (a detail view of FIG. 6)
Figure 10:
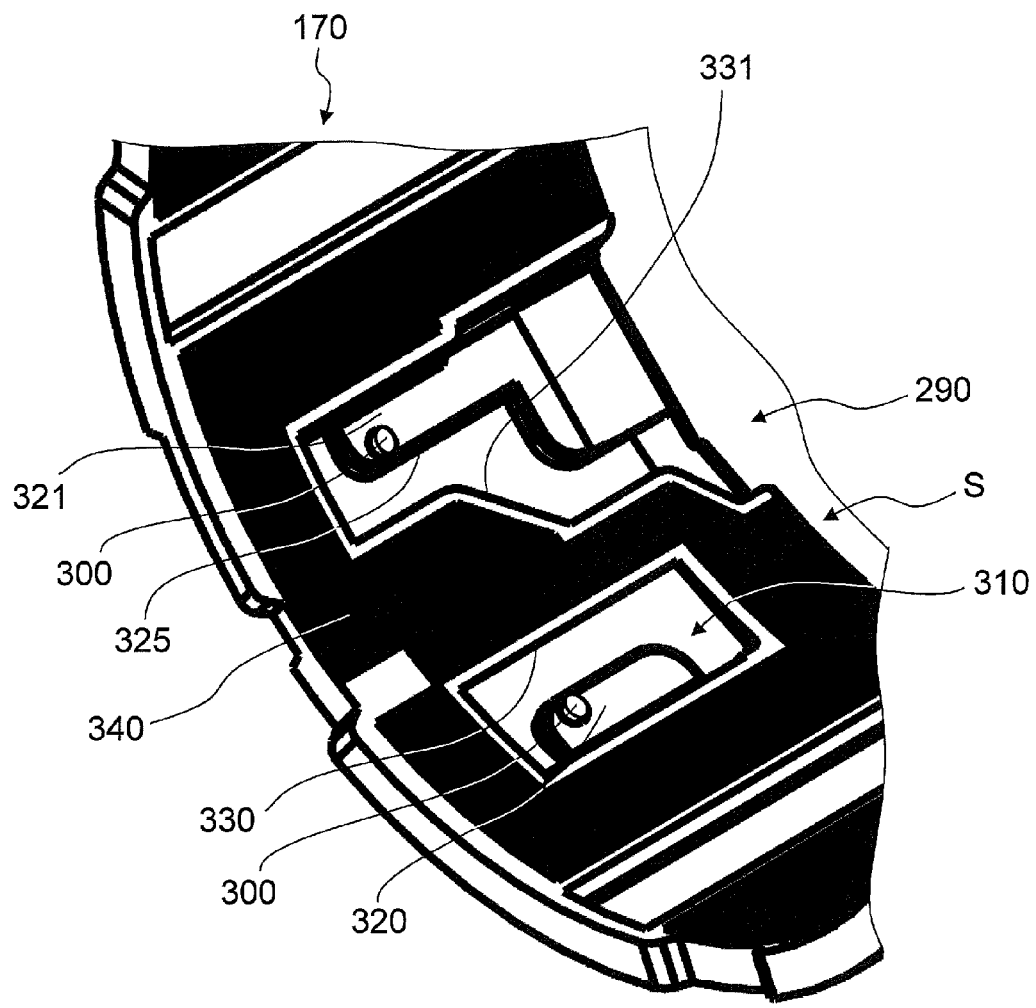
FIG. 10 is an enlarged oblique view of the storage component (a detail view of FIG. 5)

As shown in FIGS. 9 to 11, the storage component 290 has a first support portion 310, a second support portion 340, the first protrusion 300, and the second protrusion 301. The first support portion 310 and the second support portion 340 form a slit S into which the mounting portion 275 is inserted. The slit S is formed along the circumferential direction of the rectilinear frame 170.

The first support portion 310 is disposed on the outer peripheral side of the mounting portion 275, and comes into contact with part of the edge of a first main face 281. More specifically, the first support portion 310 has a first contact portion 320 and a second contact portion 321. The first contact portion 320 and the second contact portion 321 are disposed spaced apart in the circumferential direction of the rectilinear frame 170. As shown in FIG. 11, the first main face 281 has a first edge part 281a and a second edge part 281b. The first edge part 281a is disposed parallel to the optical axis direction. The second edge part 281b is disposed parallel to the optical axis direction, and is disposed on the opposite side from the first edge part 281a. The first contact portion 320 comes into contact with the first edge part 281a, and the second support portion 340 comes into contact with the second edge part 281b.

Meanwhile, the second support portion 340 is disposed on the inner peripheral side of the mounting portion 275, and comes into contact with a second main face 282. In this embodiment, the second support portion 340 comes into contact with the central part of the second surface 282a. The second support portion 340 is disposed between the first protrusion 300 and the second protrusion 301 in the circumferential direction of the rectilinear frame 170.

The first protrusion 300 (an example of a first protrusion, and an example of a protrusion) protrudes from the first contact portion 320 in the radial direction of the rectilinear frame 170 (an example of a second direction perpendicular to the optical axis direction), and is inserted into the first support hole 311. In this embodiment, the first protrusion 300 protrudes inward in the radial direction from the first contact portion 320.

The second protrusion 301 (an example of a second protrusion, and an example of a protrusion) protrudes from the second contact portion 321 in the radial direction of the rectilinear frame 170, and is inserted into the second support hole 312. In this embodiment, the second protrusion 301 protrudes inward in the radial direction from the second contact portion 321.

In this embodiment, the mounting portion 275 is not fixed to the storage component 290 through the use of a separate member, but instead the first protrusion 300 and the second protrusion 301 are fitted into the first support hole 311 and the second support hole 312, respectively, to mount the mounting portion 275 to the storage component 290. That is, the mounting portion 275 is removably hooked or connected to the first and second protrusions 300 and 301.

Furthermore, as shown in FIGS. 9 to 11, the storage component 290 has a cut-out 325, a first opening 330, and a second opening 331.

As shown in FIG. 11, the cut-out 325 is disposed on the outer peripheral side of the mounting portion 275 and the second support portion 340, and is formed between the first contact portion 320 and the second contact portion 321 in the circumferential direction of the rectilinear frame 170. The mounting portion 275 is exposed on the outer peripheral side of the rectilinear frame 170 through the cut-out 325. As shown in FIGS. 9 and 10, since the cut-out 325 is disposed at a position corresponding to the second support portion 340, in a state in which the mounting portion 275 is not inserted into the storage component 290, part of the second support portion 340 is exposed on the outer peripheral side of the rectilinear frame 170 through the cut-out 325.

As shown in FIGS. 9 to 11, the first opening 330 and the second opening 331 are disposed on both sides of the second support portion 340 in the circumferential direction of the rectilinear frame 170. The first opening 330 is disposed on the inner peripheral side of the mounting portion 275, and is disposed on the opposite side from the first contact portion 320 with respect to the mounting portion 275. Since the first protrusion 300 is disposed within the circumference/range of the first opening 330, the area around the first protrusion 300 of the mounting portion 275 can be kept away from the first opening 330 during attachment and removal of the mounting portion 275. The second opening 331 is disposed on the inner peripheral side of the mounting portion 275, and is disposed on the opposite side from the second contact portion 321 with respect to the mounting portion 275. Since the second protrusion 301 is disposed within the circumference/range of the second opening 331, the area around the second protrusion 301 of the mounting portion 275 can be kept away from the second opening 331 during attachment and removal of the mounting portion 275.

Because of the above constitution, the mounting portion 275 of the flexible wire 190 is removably mounted to the storage component 290.

Operation of Lens Barrel

The operation of the lens barrel 100 will be described through reference to FIGS. 2 to 4. As shown in FIG. 2, at the wide angle end the first to third moving lens barrels 120a to 120c are deployed from the fixed lens barrel 110. As shown in FIG. 3, at the telephoto end the first to third moving lens barrels 120a to 120c are deployed the farthest out. At this point, the rectilinear frame 170 is farthest away from the fixed lens barrel 110, and the second lens frame 130b is also farthest away from the fixed lens barrel 110. Therefore, the first linking portion 193a and the first intermediate portion 193b of the flexible wire 190 are in their tautest state. As shown in FIG. 3, since a maximum movement amount D1 of the second lens frame 130b with respect to the fixed lens barrel 110 is greater than a maximum movement amount D2 of the second moving lens barrel 120b with respect to the fixed lens barrel 110, the second lens frame 130b is farther from the fixed lens barrel 110 than the second moving lens barrel 120b.

Meanwhile, as shown in FIG. 4, when the lens barrel is not being used for imaging (that is, when it is retracted), the first to third moving lens barrels 120a to 120c are stowed away in the fixed lens barrel 110. Here, the rectilinear frame 170 approaches the master flange 240 of the fixed lens barrel 110, and the second lens frame 130b approaches the master flange 240 of the fixed lens barrel 110. Accordingly, the first linking portion 193a and the first intermediate portion 193b of the flexible wire 190 are in a slackened state.

Features of Lens Barrel

The features of the lens barrel 100 described above will now be discussed.

(1) With the lens barrel 100, elastic force of the mounting portion 275 is utilized so that the storage component 290 supports the mounting portion 275, so it is less likely that the mounting state of the flexible wire 190 with respect to the rectilinear frame 170 will change as a result of environmental changes or elapsed time. Also, in some cases the rectilinear frame 170 can support the mounting portion 275 without the use of tape or another such fixing member, so the mounting state of the flexible wire 190 with respect to the mounting portion 275 will not be affected by changes over time.

As discussed above, with the lens barrel 100, the flexible wire 190 can be easily removed, and stability of the mounting state can be improved.

Also, since the mounting portion 275 is inserted into the slit S of the storage component 290, this prevents the mounting portion 275 from interfering with members on the outer peripheral side or inner peripheral side of the rectilinear frame 170, and prevents damage to the flexible wire 190.

(2) Since the stiffness of the reinforcing member 280 is higher than the stiffness of the curved part 270, the stiffness of the mounting portion 275 is higher, and the elastic force can be increased when the mounting portion 275 is bent. This makes the mounting portion 275 less likely to fall out of the storage component 290.

Also, the first protrusion 300 of the storage component 290 is inserted into the first support hole 311, and the second protrusion 301 is inserted into the second support hole 312. Accordingly, the first protrusion 300 and the second protrusion 301 increase the attachment strength of the mounting portion 275, and the mounting portion 275 can be attached to the rectilinear frame 170, without having to use a separate member to fix the mounting portion 275 to the rectilinear frame 170.

Furthermore, the first protrusion 300 protrudes inward in the radial direction from the first contact portion 320, and the second protrusion 301 protrudes inward in the radial direction from the second contact portion 321. The mounting portion 275 is pressed by elastic force against the first contact portion 320, and is pressed against the second contact portion 321. Therefore, the elastic force of the mounting portion 275 makes it less likely that the first protrusion 300 will come loose from the first support hole 311, and less likely that the second protrusion 301 will come loose from the second support hole 312. Therefore, the elastic force of the mounting portion 275 can be utilized to increase the attachment strength of the mounting portion 275.

(3) Since the storage component 290 has the cut-out 325, the mounting portion 275 can be manipulated from the cut-out 325 in the attachment and removal of the mounting portion 275. For example, the mounting portion 275 can be slid in the optical axis direction by inserting pliers or another such tool into the auxiliary hole 315 of the mounting portion 275. Thus providing the cut-out 325 makes attachment and removal of the mounting portion 275 easier.

(4) The storage component 290 has the first opening 330, which is disposed on the opposite side from the first contact portion 320 with respect to the mounting portion 275, and the second opening 331, which is disposed on the opposite side from the second contact portion 321 with respect to the mounting portion 275. The first protrusion 300 is disposed within the circumference/range of the first opening 330, and the second protrusion 301 is disposed within the circumference/range of the second opening 331. With this constitution, the area around the first protrusion 300 of the mounting portion 275 can be kept away from the first opening 330, and the area around the second protrusion 301 of the mounting portion 275 can be kept away from the second opening 331, during attachment and removal of the mounting portion 275. Therefore, even though the first protrusion 300 and the second protrusion 301, the mounting portion 275 is still easy to attach and remove to and from the rectilinear frame 170.

(5) Since the mounting portion 275 is inserted into the storage component 290 from the rear (the side on which the CCD unit 260 is disposed), even if the rectilinear frame 170 moves away from the fixed lens barrel 110, the flexible wire 190 will tend not to hinder the movement of the rectilinear frame 170. Also, the mounting portion 275 is easier to attach and remove to and from the storage component 290 during assembly or maintenance of the lens barrel 100, so work is facilitated.

Other Embodiments

Embodiments of the present invention are not limited to what was given above, and various improvements and changes are possible without departing from the gist of the invention. Also, the above embodiment is fundamentally a preferred example, and is not intended to limit the scope of the present invention, or its applications, or the range of its applications.

(1) The configuration of the flexible wire 190 is not limited to that in the above embodiment. For example, the first end 190b can include at least one terminal, and the second end can include at least one terminal.

Also, the mounting portion 275 has the U-shaped curved part 270, but the mounting portion 275 can have some other shape instead.

Furthermore, in the above embodiment the curved part 270 and the reinforcing member 280 are separate components, but can be formed integrally. For example, the area around the curved part 270 can be formed from a stiff film.

(2) The storage component 290 has the first protrusion 300 and the second protrusion 301, but the storage component can have at least one protrusion. Also, the protrusion of the storage component can protrude outward in the radial direction from the first support portion 310, or it can be provided to the second support portion 340 instead of the first support portion 310. Furthermore, the mounting portion 275 has the first support hole 311 and the second support hole 312, but can have at least one hole into which a protrusion is inserted. The auxiliary hole 315 can be omitted.

Figure 12:
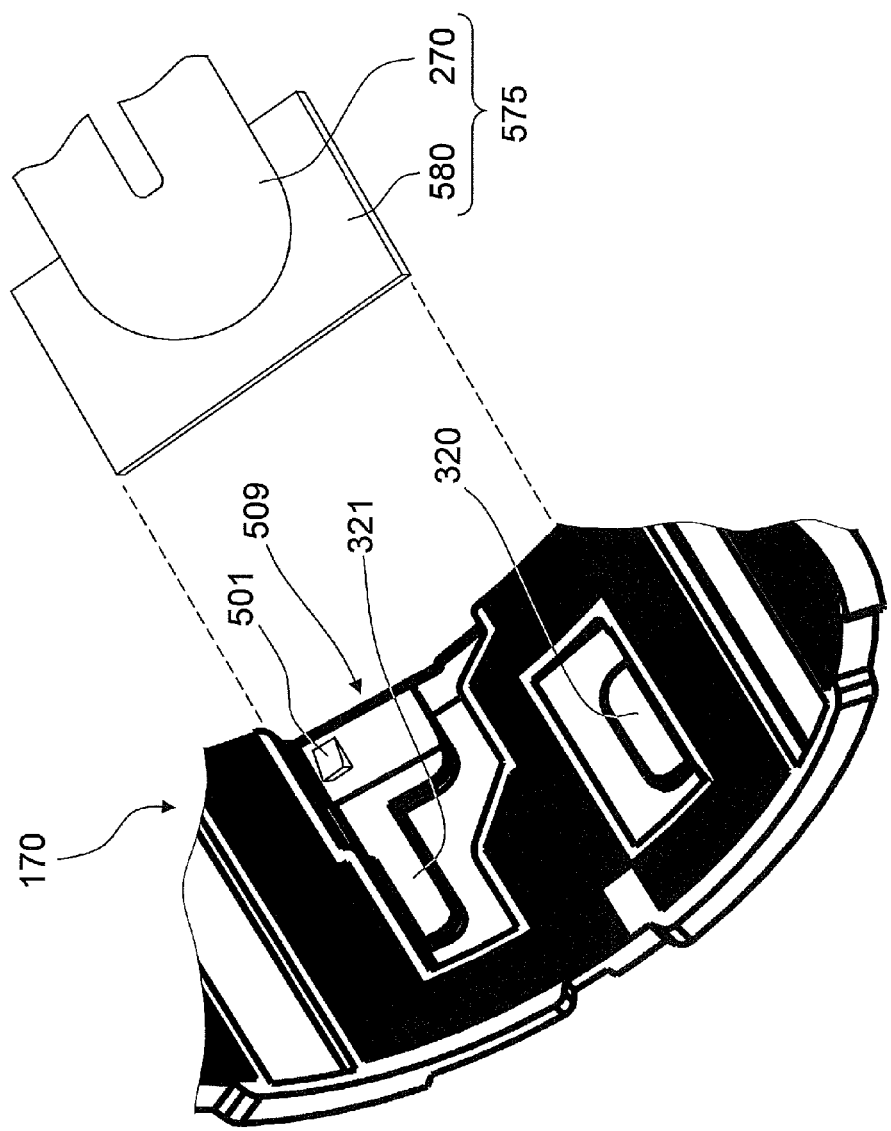
FIG. 12 is an exploded oblique view of a mounting portion and the storage component (other embodiment)
Figure 13A:
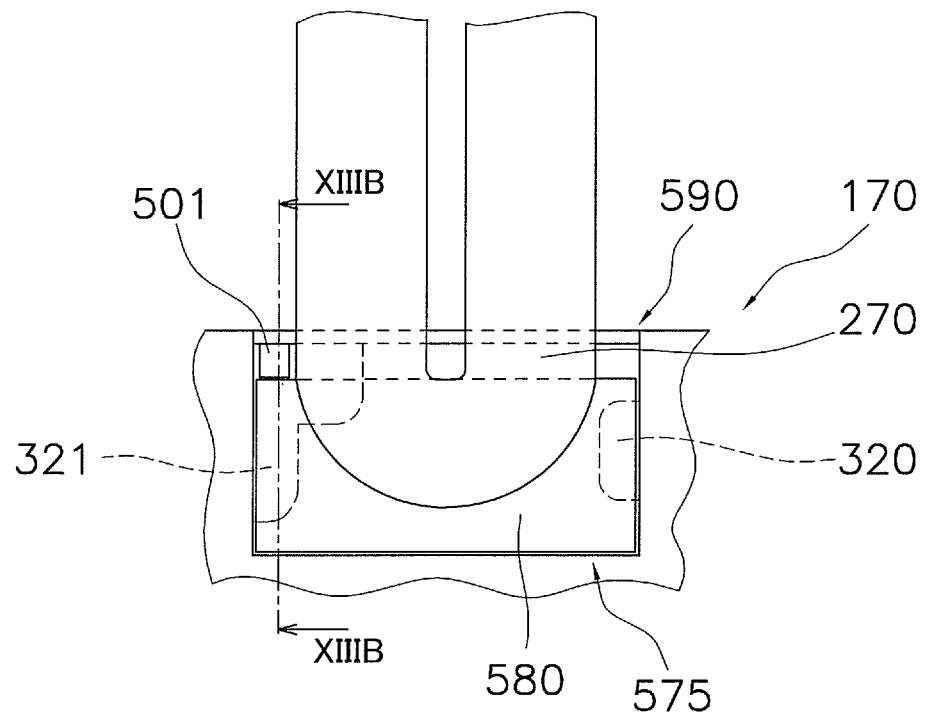
FIG. 13A is schematic plan view of the mounting portion and the storage component (other embodiment)
Figure 13B:
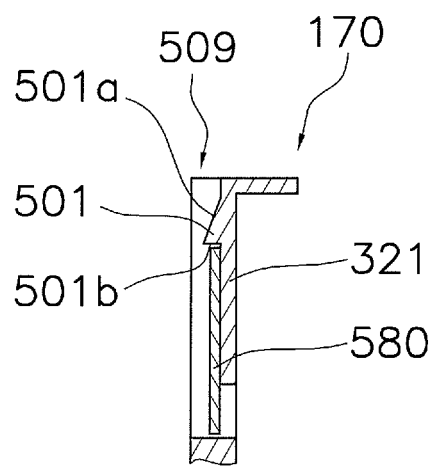
FIG. 13B is XIIIA-XIIIA cross section of FIG. 13A (other embodiment)

(3) It could be thought that the mounting portion 275 does not have the first and second support holes 311 and 312. More specifically, as shown in FIGS. 12, 13A and 13B, the mounting portion 575 has the curved part 270 and the reinforcing member 580. The reinforcing member 580 is longer than reinforcing member 280 in the circumferential direction of the second moving lens barrel 120b, and protrudes to the both circumferential sides from the curved part 270.

On the other hand, the storage component 590 has substantially the same configuration as the above mentioned storage component 290, and has a restricting projection 501 (an example of a restriction portion) instead of the first and second protrusions 300 and 301. The restricting projection 501 restricts movement of the mounting portion 575 with respect to the second moving lens barrel 120b in the optical axis direction. For instance, the restricting projection 501 is disposed at an rear end (an a subject side end) of the second contact portion 321, and protrudes inward from the second contact portion 321 in the radial direction. The mounting portion 575 is removably hooked or connected to the restricting projection 501.

As shown in FIGS. 13A and 13B, when the mounting portion 575 is inserted into the storage component 590, the restricting projection 501 is disposed adjacent to the curved part 270. The restricting projection 501 is arranged to be contactable with the reinforcing member 580 in the optical axis direction. The reinforcing member 580 is inserted in a bent state into the storage component 590. The both edge parts of the reinforcing member 580 are pressed to the first and second contact portions 320 and 321 by the elastic force of the reinforcing member 580. Therefore, the reinforcing member 580 is more likely to be hooked or connected by the restricting projection 501.

As shown in FIG. 13B, the restricting projection 501 has an inclined surface 501a and a stopper surface 501b. The inclined surface 501a is inclined with respect to the optical axis direction. When the mounting portion 575 is inserted into the storage component 590, the inclined surface 501a inward guides the reinforcing member 580 in the radial direction. This allows the reinforcing member 580 to be easily inserted into the storage component 590. The stopper surface 501b is perpendicular to the optical axis direction. When the mounting portion 575 is inserted into the storage component 590, the reinforcing member 580 comes into contact with the stopper surface 501b in the optical axis direction. Therefore, the mounting member 575 can be prevented from falling off from the storage component 590.

The above configuration also allows to restrict movement of the mounting portion 575 with respect to the second moving lens barrel 120b in the optical axis direction. That is, the flexible wire 190 can be easily removed, and stability of the mounting state can be improved.

(4) The shape and disposition of the first support portion 310 and the second support portion 340 are not limited to those in the above embodiment. For example, the first support portion 310 has the first contact portion 320 and the second contact portion 321 that are separate portions, but the first support portion 310 can be formed from integral portions. Also, the second support portion 340 can be formed from a plurality of portions.

(5) The mounting portion 275 is mounted to the second moving lens barrel 120b, but can instead be mounted to another moving lens barrel, such as the first moving lens barrel 120a or the third moving lens barrel 120c. Also, the second end 190a and the mounting portion 275 can be supported by the same support frame (such as the second lens frame 130b).

Figure 14A:
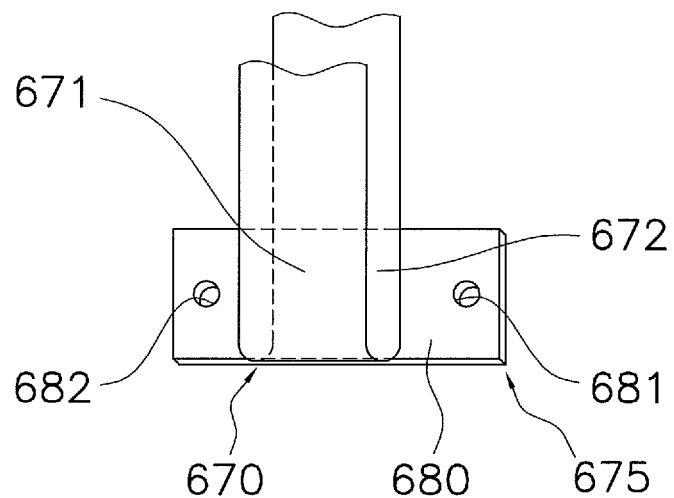
FIGS. 14A and 14B are schematic diagrams (other embodiment)
Figure 14B:
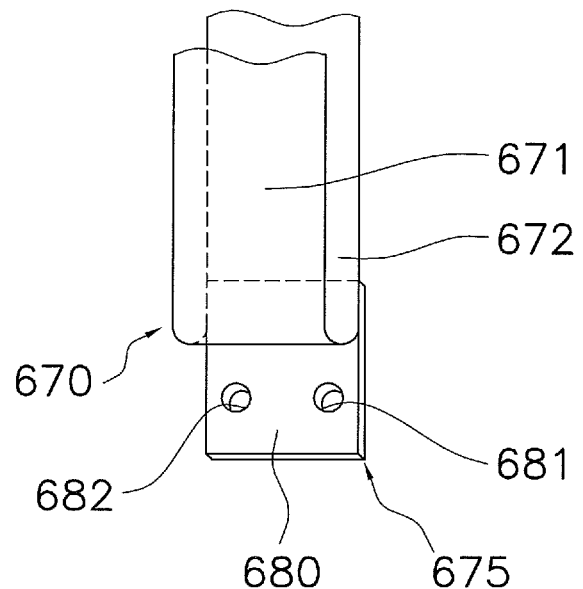

(6) In the above embodiment, the storage component 290 supports the mounting portion 275 using mainly the elastic force of the reinforcing member 280, but the elastic force of the wiring part on which the wires are printed can be used. For example, as shown in FIGS. 14A and 14B, a mounting portion 675 has a folded portion 670 (an example of a wiring part) and a reinforcing member 680. The folded portion 670 is formed by folding band-shaped portions. More specifically, the folded portion 670 has a band-shaped first portion 671 and a band-shaped second portion 672. The first and second portions 671 and 672 overlap with each other when the first and second portions 671 and 672 are inserted into the storage component 290.

The reinforcing member 680 is a flat member and fixed to the folded portion 670 (more specifically, the second portion 672). The reinforcing member 680 has first and second support holes 681 and 682.

Figure 15:
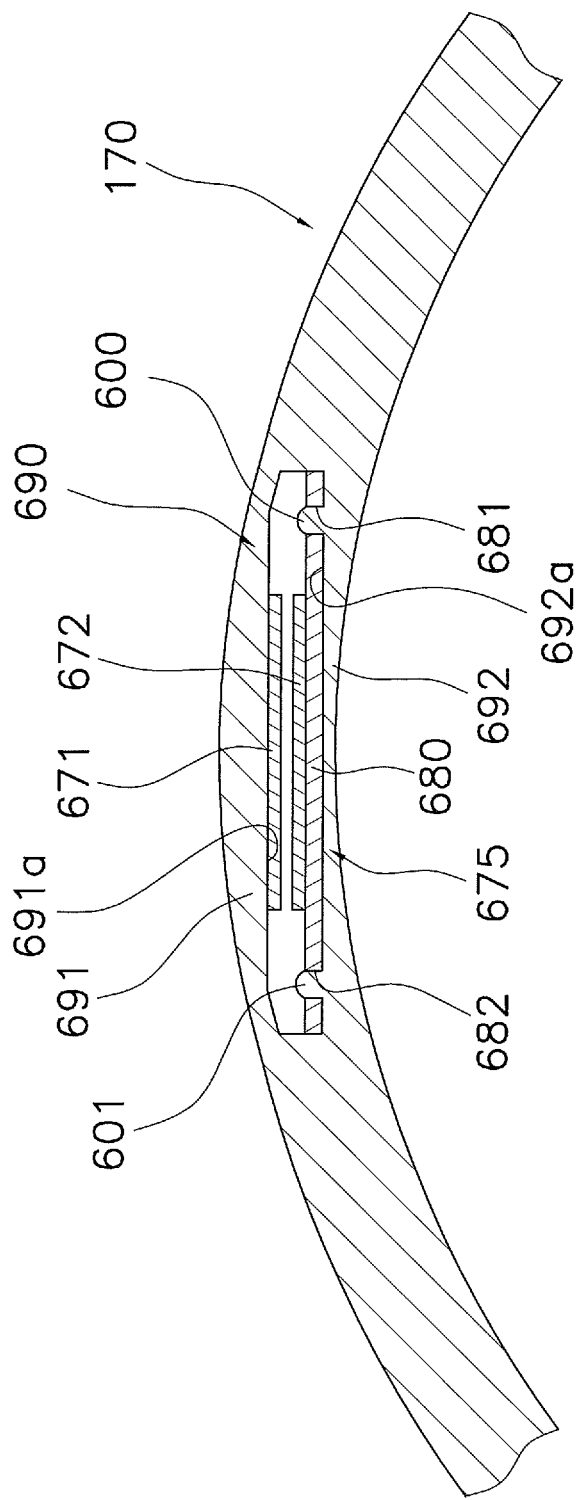
FIG. 15 is a cross section of the storage component and the flexible wire (other embodiment).

On the other hand, as shown in FIG. 15, the second moving lens barrel 120b includes a storage component 690. FIG. 15 is a cross section corresponding to FIG. 11, and corresponds to the embodiment shown in FIG. 14A. The storage component 690 has an outer support part 691, an inner support part 692, a first protrusion 600 and a second protrusion 601. The first and second protrusions 600 and 601 are examples of a restricting portion.

The outer support part 691 has a flat outer support surface 691a. The inner support part 692 has a flat inner support surface 692a. The mounting portion 675 is inserted between the outer support part 691 and inner support part 692. The first part 671 of the folded portion 670 comes into contact with the outer support surface 691a. The reinforcing member 680 comes into contact with the inner support surface 692a of the inner support part 692.

The first protrusion 600 and second protrusion 601 restrict movement of the mounting portion 675 with respect to the second moving lens barrel 120b, and protrude outward from the inner support part 692 in the radial direction. The first protrusion 600 and second protrusion 601 are inserted in the first support hole 681 and second support hole 682 formed in the reinforcing member 680, respectively.

Unlike the above mentioned storage components 290 and 590, the reinforcing member 680 is inserted in the storage component 690 along with the folded portion 670 without undergoing a deflection. The folded portion 670 is inserted in the storage component 690 in a folded state. The elastic force of the reinforcing member 670 leads the first and second protrusions 600 and 601 to be easily supported in the first and second support holes 681 and 682.

The above configuration also allows movement of the mounting portion 675 to be restricted with respect to the second moving lens barrel 120b in the optical axis direction. That is, the flexible wire 190 can be easily removed, and stability of the mounting state can be improved.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device equipped with the lens barrel. Accordingly, these terms, as utilized to describe the present invention should be interpreted relative to the imaging device equipped with the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

What is claimed is:

1. A lens barrel comprising:
a flexible wire including a first end having at least one terminal, a second end having at least one terminal, and a flexible mounting portion disposed between the first end and the second end, the mounting portion being movable in a first direction relative to the first end, and the second end being movable in the first direction relative to the first end and the mounting portion;
a first supporting frame configured to support the first end; and
a second supporting frame having a storage component configured to support the mounting portion by way of the elastic force of the mounting portion, the second supporting frame being movably disposed in a first direction with respect to the first supporting frame.

2. A lens barrel comprising:
a flexible wire including a first end having at least one terminal, a second end having at least one terminal, and a mounting portion disposed between the first end and the second end, the mounting portion being movable in a first direction relative to the first end, and the second end being movable in the first direction relative to the first end and the mounting portion;
a first supporting frame configured to support the first end; and
a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame.

3. A lens barrel comprising:
a flexible wire including a first end having at least one terminal, a second end having at least one terminal, and a flexible mounting portion disposed between the first end and the second end, the mounting portion including a wiring part on which wires are printed and a reinforcing member fixed to the wiring part, the stiffness of the reinforcing member is higher than the stiffness of the wiring part;
a first supporting frame configured to support the first end; and
a second supporting frame having a storage component configured to support the mounting portion by way of the elastic force of the mounting portion, the second supporting frame being movably disposed in a first direction with respect to the first supporting frame.

4. A lens barrel comprising:
a flexible wire including a first end having at least one terminal, a second end having at least one terminal, and a flexible mounting portion disposed between the first end and the second end, the mounting portion including a wiring part on which wires are printed and a reinforcing member fixed to the wiring part, the stiffness of the reinforcing member is higher than the stiffness of the wiring part;
a first supporting frame configured to support the first end; and
a second supporting frame having a storage component configured to support the mounting portion by way of the elastic force of the mounting portion, the second supporting frame being movably disposed in a first direction with respect to the first supporting frame, the reinforcing member being inserted into the storage component in a bent state.

5. A lens barrel comprising:
a flexible wire including a first end having at least one terminal, a second end having at least one terminal, and a flexible mounting portion disposed between the first end and the second end, the mounting portion including a wiring part on which wires are printed;
a first supporting frame configured to support the first end; and
a second supporting frame having a storage component configured to support the mounting portion by way of the elastic force of the mounting portion, the second supporting frame being movably disposed in a first direction with respect to the first supporting frame, the wiring part being inserted into the storage component in a folded state.

6. A lens barrel comprising:
a flexible wire including a first end having at least one terminal, a second end having at least one terminal, and a flexible mounting portion disposed between the first end and the second end, the mounting portion including a wiring part on which wires are printed and a reinforcing member fixed to the wiring part;
a first supporting frame configured to support the first end; and
a second supporting frame having a storage component configured to support the mounting portion by way of the elastic force of the mounting portion, the second supporting frame being movably disposed in a first direction with respect to the first supporting frame, the wiring part being inserted into the storage component in a folded state and the reinforcing member being inserted into the storage component along with the wiring part without experiencing deflection.

7. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;
a first supporting frame configured to support the first end; and
a second supporting frame having a storage component configured to support the mounting portion by way of the elastic force of the mounting portion, the second supporting frame being movably disposed in the first direction with respect to the first supporting frame, the storage component including a first support portion configured to contact the first main face and a second support portion configured to contact the second main face, the first support portion having a first contact portion configured to contact the first edge part and a second contact portion configured to contact the second edge part, the storage component further including a first protrusion that protrudes from the first contact portion and in a second direction perpendicular to the first direction and a second protrusion that protrudes from the second contact portion and in the second direction, the first protrusion being inserted into the first support hole and the second protrusion being inserted into the second support hole.

8. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;
a first supporting frame configured to support the first end; and
a second supporting frame having a storage component configured to support the mounting portion by way of the elastic force of the mounting portion, the second supporting frame being movably disposed in the first direction with respect to the first supporting frame, the storage component including a first support portion disposed on the outer peripheral side of the mounting portion and configured to contact the first main face and a second support portion disposed on the inner peripheral side of the mounting portion and configured to contact the second main face, the first support portion having a first contact portion configured to contact the first edge part and a second contact portion configured to contact the second edge part, the storage component further including a first protrusion that extends inwardly from the first contact portion in a second direction perpendicular to the first direction and a second protrusion that extends inwardly from the second contact portion in the second direction, the first protrusion being inserted into the first support hole and the second protrusion being inserted into the second support hole.

9. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;
a first supporting frame configured to support the first end; and
a second supporting frame having a storage component configured to support the mounting portion by way of the elastic force of the mounting portion, the second supporting frame being movably disposed in the first direction with respect to the first supporting frame, the storage component including a first support portion configured to contact the first main face and a second support portion configured to contact the second main face, the first support portion having a first contact portion configured to contact the first edge part and a second contact portion configured to contact the second edge part, the first and second contact portions defining a cut-out portion along the circumferential direction of the second supporting frame, the storage component further including a first protrusion that extends from the first contact portion in a second direction perpendicular to the first direction and a second protrusion that extends from the second contact portion in the second direction, the first protrusion being inserted into the first support hole, and the second protrusion being inserted into the second support hole.

10. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;
a first supporting frame configured to support the first end; and
a second supporting frame having a storage component configured to support the mounting portion by way of the elastic force of the mounting portion, the second supporting frame being movably disposed in the first direction with respect to the first supporting frame, the storage component including a first support portion configured to contact the first main face and a second support portion configured to contact the second main face, the first support portion having a first contact portion configured to contact the first edge part and a second contact portion configured to contact the second edge part, the second support portion being disposed between the first protrusion and the second protrusion in the circumferential direction of the second supporting frame, the first and second contact portions defining a cut-out portion along the circumferential direction of the second supporting frame, the storage component further including a first protrusion that extends from the first contact portion in a second direction perpendicular to the first direction and a second protrusion that extends from the second contact portion in the second direction, the first protrusion being inserted into the first support hole, and the second protrusion being inserted into the second support hole.

11. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;

a first supporting frame configured to support the first end; and a second supporting frame having a storage component configured to support the mounting portion by way of the elastic force of the mounting portion, the second supporting frame being movably disposed in the first direction with respect to the first supporting frame, the storage component including a first support portion configured to contact the first main face and a second support portion configured to contact the second main face, the first support portion having a first contact portion configured to contact the first edge part and a second contact portion configured to contact the second edge part, the first and second contact portions defining a cut-out portion along the circumferential direction of the second supporting frame, the storage component further including a first protrusion that extends from the first contact portion in a second direction perpendicular to the first direction and a second protrusion that extends from the second contact portion in the second direction, the first protrusion being inserted into the first support hole, and the second protrusion being inserted into the second support hole, the storage component further including a first opening formed opposite to the first contact portion and a second opening formed opposite to the second contact portion.

12. A lens barrel comprising:
a flexible wire including a first end having at least one terminal, a second end having at least one terminal, and a flexible mounting portion disposed between the first end and the second end, the mounting portion including a first main face and a second main face, the first main face having a first edge part disposed parallel to a first direction and a second edge part arranged parallel to the first direction and disposed on the opposite side of the first main face from the first edge part, the mounting portion further including a first support hole and a second support hole;

a first supporting frame configured to support the first end; and a second supporting frame having a storage component configured to support the mounting portion by way of the elastic force of the mounting portion, the second supporting frame being movably disposed in the first direction with respect to the first supporting frame, the storage component including a first support portion configured to contact the first main face and a second support portion configured to contact the second main face, the first support portion having a first contact portion configured to contact the first edge part and a second contact portion configured to contact the second edge part, the first and second contact portions defining a cut-out portion along the circumferential direction of the second supporting frame, the storage component further including a first protrusion that projects from the first contact portion in a second direction perpendicular to the first direction and a second protrusion that projects from the second contact portion in the second direction, the first protrusion being inserted into the first support hole, and the second protrusion being inserted into the second support hole, the storage component further including a first opening formed opposite to the first contact portion and a second opening formed opposite to the second contact portion, the first protrusion being disposed within the circumference of the first opening, and the second protrusion being disposed within the circumference of the second opening.

13. A lens barrel comprising:
a flexible wire including a first end having at least one terminal, a second end having at least one terminal, and a flexible mounting portion disposed between the first end and the second end;

a first supporting frame configured to support the first end;

a second supporting frame having a storage component configured to support the mounting portion by way of the elastic force of the mounting portion, the second supporting frame being movably disposed in a first direction with respect to the first supporting frame; and a third supporting frame configured to support the second end, the third supporting frame being movably arranged in the first direction with respect to the first supporting frame, the maximum movement amount of the third supporting frame relative to the first supporting frame being greater than the maximum movement amount of the second supporting frame relative to the first supporting frame.

14. A lens barrel comprising:
a flexible wire including a first end having at least one terminal, a second end having at least one terminal, and a flexible mounting portion disposed between the first end and the second end, the flexible wire further including a first linking portion and a second linking portion, the first linking portion links the first end and the mounting portion, and the second linking portion links the second end and the mounting portion;

a first supporting frame configured to support the first end; and a second supporting frame having a storage component configured to support the mounting portion by way of the elastic force of the mounting portion, the second supporting frame being movably disposed in a first direction with respect to the first supporting frame, wherein the stiffness of the mounting portion being higher than the stiffness of the first linking portion and the second linking portion.

15. A lens barrel comprising:
a flexible wire including a first end having at least one terminal, a second end having at least one terminal, and a flexible mounting portion disposed between the first end and the second end;

a first supporting frame configured to support the first end;

a second supporting frame having a storage component configured to support the mounting portion by way of the elastic force of the mounting portion, the second supporting frame being movably disposed in a first direction with respect to the first supporting frame; and an imaging element configured to convert light into an electrical signal, the imaging element being fixed to the first supporting frame, the mounting portion being inserted into the same side of the storage component where the imaging element is disposed.

16. A lens barrel comprising:
a flexible wire including a first end having at least one terminal, a second end having at least one terminal, and a mounting portion disposed between the first end and the second end, the mounting portion including a wiring part on which wires are printed;

a first supporting frame configured to support the first end; and a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame, the wiring part being inserted into the storage component in a folded state.

17. A lens barrel comprising:
a flexible wire including a first end having at least one terminal, a second end having at least one terminal, and a mounting portion disposed between the first end and the second end, the mounting portion including a wiring part on which wires are printed and a reinforcing member fixed to the wiring part;
a first supporting frame configured to support the first end; and
a second supporting frame having a storage component configured to support the mounting portion, and the second supporting frame being movably arranged in a first direction with respect to the first supporting frame,
the storage component including a restricting portion removably coupled to the mounting portion to restrict movement of the mounting portion with respect to the second supporting frame, the wiring part and the reinforcing member being inserted into the storage component without experiencing deflection.

18. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;
a first supporting frame configured to support the first end; and
a second supporting frame having a storage component configured to support the mounting portion, and the second supporting frame being movably arranged in a first direction with respect to the first supporting frame,
the storage component including a restricting portion removably coupled to the mounting portion to restrict movement of the mounting portion with respect to the second supporting frame, a first support portion that comes into contact with the first main face, and a second support portion that comes into contact with the second main face, the first support portion having a first contact portion configured to contact with the first edge part and a second contact portion configured to contact with the second edge part, the storage component further including a first protrusion that extends from the first contact portion in a second direction perpendicular to the first direction and is inserted into the first support hole, and a second protrusion that extends from the second contact portion in the second direction and is inserted into the second support hole.

19. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;
a first supporting frame configured to support the first end; and
a second supporting frame having a storage component configured to support the mounting portion, and the second supporting frame being movably arranged in a first direction with respect to the first supporting frame,
the storage component including a restricting portion removably coupled to the mounting portion to restrict movement of the mounting portion with respect to the second supporting frame, a first support portion disposed on the outer peripheral side of the mounting portion and configured to contact the first main face, and a second support portion disposed on the inner peripheral side of the mounting portion and configured to contact the second main face, the first support portion having a first contact portion configured to contact with the first edge part and a second contact portion configured to contact with the second edge part, the storage component further including a first protrusion that extends inwardly from the first contact portion in a second direction perpendicular to the first direction and is inserted into the first support hole, and a second protrusion that extends inwardly from the second contact portion in the second direction and is inserted into the second support hole.

20. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;
a first supporting frame configured to support the first end; and
a second supporting frame having a storage component configured to support the mounting portion, and the second supporting frame being movably arranged in a first direction with respect to the first supporting frame,
the storage component including a restricting portion removably coupled to the mounting portion to restrict movement of the mounting portion with respect to the second supporting frame, a first support portion that comes into contact with the first main face, and a second support portion that comes into contact with the second main face, the first support portion having a first contact portion configured to contact with the first edge part and a second contact portion configured to contact with the second edge part, the first and the second contact portions defining a cut-out portion along the circumferential direction of the second supporting frame, the storage component further including a first protrusion that extends from the first contact portion in a second direction perpendicular to the first direction and is inserted into the first support hole, and a second protrusion that extends from the second contact portion in the second direction and is inserted into the second support hole.

21. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;

a first supporting frame configured to support the first end; and a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame, a first support portion that comes into contact with the first main face, and a second support portion that comes into contact with the second main face, the first support portion having a first contact portion configured to contact with the first edge part and a second contact portion configured to contact with the second edge part, the first and the second contact portions defining a cut-out portion along the circumferential direction of the second supporting frame, the storage component further including a first protrusion that extends from the first contact portion in a second direction perpendicular to the first direction and is inserted into the first support hole, and a second protrusion that extends from the second contact portion in the second direction and is inserted into the second support hole, the second support portion being disposed between the first protrusion and the second protrusion in the circumferential direction of the second supporting frame.

22. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;

a first supporting frame configured to support the first end; and a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame, a first support portion that comes into contact with the first main face, and a second support portion that comes into contact with the second main face, the first support portion having a first contact portion configured to contact with the first edge part and a second contact portion configured to contact with the second edge part, the first and the second contact portions defining a cut-out portion along the circumferential direction of the second supporting frame, the storage component further including a first opening formed opposite to the first contact portion, a second opening formed opposite to the second contact portion, a first protrusion that extends from the first contact portion in a second direction perpendicular to the first direction and is inserted into the first support hole, and a second protrusion that extends from the second contact portion in the second direction and is inserted into the second support hole.

23. A lens barrel comprising:
a flexible wire including a first end having at least one terminal, a second end having at least one terminal, and a mounting portion disposed between the first end and the second end, the mounting portion including a first main face and a second main face, the first main face having a first edge part and a second edge part, the first edge part being arranged parallel to a first direction, and the second edge part being disposed parallel to the first direction and on the opposite side of the first main face from the first edge part, the mounting portion further including a first support hole and a second support hole;

a first supporting frame configured to support the first end; and a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame, a first support portion that comes into contact with the first main face, and a second support portion that comes into contact with the second main face, the first support portion having a first contact portion configured to contact with the first edge part and a second contact portion configured to contact with the second edge part, the first and the second contact portions defining a cut-out portion along the circumferential direction of the second supporting frame, the storage component further including a first opening formed opposite to the first contact portion, a second opening formed opposite to the second contact portion, a first protrusion disposed within the circumference of the first opening, and a second protrusion disposed within the circumference of the second opening, the first protrusion extending from the first contact portion in a second direction perpendicular to the first direction and is inserted into the first support hole, and the second protrusion extending from the second contact portion in the second direction and is inserted into the second support hole.

24. A lens barrel comprising:
a flexible wire including a first end having at least one terminal, a second end having at least one terminal, and a mounting portion disposed between the first end and the second end;

a first supporting frame configured to support the first end;

a second supporting frame having a storage component configured to support the mounting portion, and the second supporting frame being movably arranged in a first direction with respect to the first supporting frame, the storage component including a restricting portion removably coupled to the mounting portion to restrict movement of the mounting portion with respect to the second supporting frame; and a third supporting frame configured to support the second
end, the third supporting frame being movably arranged
in the first direction with respect to the first supporting
frame, wherein
the maximum movement amount of the third supporting
frame relative to the first supporting frame being greater
than the maximum movement amount of the second
supporting frame relative to the first supporting frame.

\* \* \* \* \*